United States Patent
Chen

(10) Patent No.: US 6,221,956 B1
(45) Date of Patent: *Apr. 24, 2001

(54) ANIONIC POLYMER PRODUCTS AND PROCESSES

(75) Inventor: Haunn-Lin Chen, Darien, CT (US)

(73) Assignee: Cytec Industries, Inc., Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/400,490

(22) Filed: Sep. 21, 1999

Related U.S. Application Data

(63) Continuation of application No. 08/986,021, filed on Dec. 10, 1997, now Pat. No. 5,985,992.

(51) Int. Cl.$^7$ .................................................. C08L 41/00
(52) U.S. Cl. ........................... 524/814; 524/521; 524/522
(58) Field of Search .................................. 524/814, 521, 524/522

(56) References Cited

U.S. PATENT DOCUMENTS

| | | | | |
|---|---|---|---|---|
| 3,658,772 | * | 4/1972 | Volk | 260/80.3 |
| 4,379,883 | * | 4/1983 | Zecher | 526/238 |
| 4,870,143 | * | 9/1989 | Hashiguchi | 526/346 |
| 4,931,207 | * | 6/1990 | Cramer | 524/522 |
| 5,597,859 | * | 1/1997 | Hurlock | 524/458 |
| 5,650,256 | * | 7/1997 | Veregin | 523/335 |
| 5,650,465 | * | 7/1997 | Ryan | 524/801 |
| 6,001,920 | | 12/1999 | Ghafoor et al. | 524/500 |
| 6,025,426 | | 2/2000 | Hurlock | 524/458 |
| 6,031,037 | | 2/2000 | Ghafoor et al. | 524/388 |
| 6,036,868 | | 3/2000 | Sivakumar et al. | 210/708 |

* cited by examiner

*Primary Examiner*—Paul R. Michl
(74) *Attorney, Agent, or Firm*—Knobbe, Martens, Olson & Bear, LLP

(57) ABSTRACT

Aqueous dispersions of anionic water-soluble or water-swellable polymers are provided, where the polymers have an anionic charge of greater than 16% and where the dispersions maintain their form at a pH of 5.1 or greater. Processes for making these dispersions are also disclosed, as well as methods of using these dispersions to treat water containing various types of suspended materials. Dry polymers, preferably formed by drying these aqueous dispersions, are also disclosed.

43 Claims, No Drawings

ANIONIC POLYMER PRODUCTS AND PROCESSES

This application is a continuation of U.S. Ser. No. 08/986,021, filed Dec. 10, 1997, U.S. Pat. No. 5,985,992.

BACKGROUND OF THE INVENTION

This invention relates to aqueous dispersions comprised of anionic water-soluble or water-swellable polrners, processes for making said dispersions, and methods of using said dispersions in water treating, dewatering, water clarification, papermaking, oil field, soil conditioning, food processing, mineral processing and biotechnological applications.

U.S. Pat. No. 3,658,772 discloses a process of copolymerizing a monomer composition of ethylenically unsaturated water-soluble monomers in an aqueous solution containing inorganic salts at a pH within the range from about 1 to 3.2 to produce a fluid suspension of dispersed solid-polymer particles. According to this patent, the polymers are comprised of at least 30 percent to about 95 percent of acrylic acid and from 0 percent up to 70 percent of acrylamide recurring units. The inorganic salt is present in an amount sufficient to precipitate the polymer as it is polymerized in solution. It is critical that the pH be within the stated range because the salt form of the polymer is more readily soluble. This patent is related to U.S. Pat. No. 3,493,500 which also discloses aqueous dispersions of acrylic acidlacrylamide copolymers in a continuous aqueous salt phase, where the critical pH is within the range of about 1 to about 4.

According to Japanese Patent Application Disclosure No. HEI 6-25540, an anionic dispersion in aqueous salt solution can be obtained by using dispersion polymerization to copolymerize no more than 15 mole % of a neutralized alkali (meth)acrylic acid, 2-acrylamide-2-methylpropanesulfonic acid, or the like and a polymerizable nonionic monomer such as (meth)acrylamide in an aqueous salt solution. An anionic dispersion can also be obtained by copolymerizing unneutralized (meth)acrylic acid or the like and (meth) acrylamide in an aqueous salt solution while agitating.

According to Japanese Patent Disclosure No. SHO 50-70489, there is a relationship between the sodium acrylate content of an acrylic acid/acrylamide copolymer and its solubility in an ammonium sulfate salt solution. Specifically, when the sodium acrylate content of the polymer is about 3 mole %, it is insoluble in a solution having a weight % ammonium sulfate concentration of greater than 22 percent. However, as the sodium acrylate content of the polymer becomes greater, higher and higher ammonium sulfate concentrations are required to precipitate the polymer. For instance, at a sodium acrylate content of about 16 mole % the ammonium sulfate concentration of the solution must be greater than 35 percent in order to precipitate the polymer.

There appears to be a recognition in the art that aqueous dispersions of anionic acrylamide copolymers may be formed at low pH without limitation on the anionic monomer content, but that the anionic monomer content is limited to about 15 percent at higher pH's where the anionic monomer is in the salt form. When the dispersed polymer contains greater than 15 mole percent anionic recurring units, the art recognizes that the pH of the aqueous dispersion must be low so as to keep the anionic units in their less soluble unneutralized form. The 15 percent limitation is recognized in Japanese Kokai Patent Number SHO 62(1987)-100548, SHO 62(1987)-20502, SHO 62(1987)-20511 and in EPO 183 466 B1. The art generally recognizes that the pH must be about 4 or lower, see U.S. Pat. No. 3,658,772 and U.S. Pat. No 3,493,500 discussed above. International Publication No. WO 97/34933 mentions a pH of about 2 to about 5, but the highest pH stated in the examples is only 3.63 (Example 4). European Patent Applications EPO 604 109 A2 and EPO 630 909 Al as well as U.S. Pat. No. 5,498,678 only exemplify cationic polymers.

Thus, there is a problem in that aqueous dispersions of anionic water-soluble or water-swellable polymers having an anionic content of greater than 15 percent are generally not available unless the pH of the dispersion is maintained below about 4. An anionic aqueous dispersion of a water-soluble or water-swellable polymer having a pH greater than 4 and an anionic content of greater than 15 mole percent would be desirable because these dispersions are generally utilized by admixing with water to disperse or dissolve the polymer, then utilizing the resulting diluted admixture in the desired application. It may be readily appreciated that the pH of the water may significantly affect the performance of these admixtures because of the pH sensitivity of the polymer. The problem is particularly acute when the anionic aqueous dispersion is admixed with water that is not highly alkaline e.g. neutral or slightly acidic water because the acidity of the dispersion itself may then render the resulting admixture even more acidic than the water. Therefore, it would be desirable to have an anionic aqueous dispersion with anionic content of greater than 15 mole percent that remains in the form of an aqueous dispersion at a pH greater than 4, preferably greater than 5, even more preferably greater than 6, so that the performance of the polymer could be materially increased.

Prior approaches to this problem have serious drawbacks. For instance, EPO 717 056 A2 discloses amphoteric copolymers of anionic monomers and benzyl group-containing cationic monomers in which it is preferred that the resulting polymer contain more cationic groups than anionic groups. Even if one skilled in the art were to proceed counter to this preference and prepare a polymer in which the anionic groups outnumbered the cationic groups, the inclusion of the cationic groups would still tend to dilute the anionic effect and to add extra cost. A similar dilution and cost disadvantage may result from copolymerization with a hydrophobic monomer such as in U.S. Pat. No. 5,605,970. Dilution and extra cost may also result when the anionic polymer is precipitated by a combination of kosmotropic salt and cationic organic salt as in copending U.S. Ser. Nos. 08/726, 157; 08/723,628; and 081726,158.

Disadvantages may also be apparent when a different sort of aqueous dispersion is prepared e.g. one in which the droplets of anionic polymer are not formed because of insolubility in a salt solution, but are instead the result of a phase separation process involving an incompatible second polymer. In these aqueous dispersions, salt is not necessary but instead the continuous phase contains a second polymer that is generally immiscible with the anionic polymer. For instance, in some cases the second polymer may be dilutive of the effect of the first polymer in a particular application, or may tend to viscosity the continuous phase to an undesirable extent. In this regard may be mentioned the following U.S. Pat. Nos.: 4,380,600; 5,403,883; 5,480,934; 5,541,252; 4,778,836; 4,522,968; and 4,673,704. In this regard may also be mentioned the following European publications: EPO 573 793 A1; 624 617 A1; 169 674 B1; and 170 394 A2; as well as PCT document WO 95-11269.

In spite of the effort to make satisfactory anionic aqueous dispersions, the problem remains of producing anionic aqueous dispersions of high molecular weight water-soluble or water-swellable polymers that remain in the form of aqueous dispersions, i.e., the dispersed polymer remains insoluble at high charge and high pH and that have advantageously low bulk viscosities, high active polymer solids content, minimal quantities of dilutive material, and that dissolve or disperse readily regardless of the pH of the dilution water to give polymer admixtures which have the performance characteristics that are acceptable to the industry.

SUMMARY OF THE INVENTION

This problem is solved in the present invention by providing novel anionic aqueous dispersions of generally high molecular weight water-soluble or water-swellable polymers that remain in the form of an aqueous dispersion at pH 5.1 or greater and that have an anionic content of 16 mole % or greater, as well as processes for making and methods of using said aqueous dispersions. Accordingly, an aqueous dispersion of polymers is provided which comprises (a) salt solution comprised of from about 5% to about 35% inorganic salt, by weight based on said aqueous dispersion; and (b) an anionic water-soluble or water-swellable vinyl-addition polymer that is comprised of greater than 16 mole % of anionic recurring units, based on total moles of recurring units in said polymer, and that is insoluble in said salt solution; wherein said polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous dispersion is substantially free of an amount of cationic organic salt that is effective to precipitate said polymer.

In another embodiment a process for making an aqueous dispersion is provided which comprises polymerizing anionic vinyl-addition monomers to form an anionic water-soluble or water-swellable polymer having greater than 16 mole % of anionic recurring units, based on total moles of recurring units in said polymer; wherein said polymerizing is conducted in an aqueous solution comprised of from about 5% to about 35% inorganic salt, by weight based on said aqueous dispersion; wherein said anionic vinyl-addition monomers are comprised of an amount of anionic monomers, selected from the group consisting of methacrylic acid, ethacrylic acid, maleic acid, itaconic acid, 2-acrylamido-2-methylpropanesulfonic acid, vinylsulfonic acid, vinyisulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous solution is substantially free of an amount of cationic organic salt that is effective to precipitate said polymer.

In another embodiment, a method for dewatering a suspension of dispersed solids is provided, comprising intermixing an aqueous dispersion of polymers, or aqueous admixture thereof, in an amount effective for flocculation, with a suspension of dispersed solids, and dewatering said suspension of dispersed solids, wherein said aqueous dispersion is comprised of (a) salt solution comprised of from about 5% to about 35% inorganic salt, by weight based on said aqueous dispersion; and (b) an anionic water-soluble or water-swellable vinyl-addition polymer that is comprised of greater than 16 mole % of anionic recurring units, based on total moles of recurring units in said polymer, and that is insoluble in said salt solution; wherein said polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinyisulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous dispersion is substantially free of an amount of cationic organic salt that is effective to precipitate said polymer.

In another embodiment, a process for producing substantially dry anionic water-soluble or water-swellable polymer particles is provided, comprising (a) spray-drying an anionic water-soluble or water-swellable polymer-containing aqueous dispersion Into a gas stream with a residence time of about 8 to about 120 seconds and at an outlet temperature of about 70° C. to about 150° C. and (b) collecting resultant anionic polymer particles.

In another embodiment, a process for producing substantially dry anionic water-soluble or water-swellable polymer particles is provided, comprising (1) spray-drying an anionic water-soluble or water-swellable polymer-containing aqueous dispersion into a gas stream with a residence time of about 8 to about 120 seconds and at an outlet temperature of about 70° C. to about 150° C. and (2) collecting resultant anionic polymer particles, wherein said anionic aqueous dispersion is comprised of (a) salt solution comprised of from about 5% to about 35% inorganic salt, by weight based on said aqueous dispersion; and (b) an anionic water-soluble or water-swellable vinyl-addition polymer that is comprised of greater than 16 mole % of anionic recurring units, based on total moles of recurring units in said polymer, and that is insoluble in said salt solution; wherein said polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous dispersion is substantially free of an amount of cationic organic salt that is effective to precipitate said polymer, as well as substantially dry polymer particles obtainable by this process.

In another embodiment, substantially dry polymer particles or agglomerates are provided, comprised of an anionic water-soluble or water-swellable vinyl-addition polymer that is comprised of greater than 16 mole % of anionic recurring units, based on total moles of recurring units in said polymer; wherein said polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof, that is effective to render said polymer insoluble in a salt solution at a pH of 5.1; wherein said salt solution is comprised of from about 5% to about 35% inorganic salt, by weight based on the total weight of said polymer and said salt solution, and wherein said salt solution is substantially free of an amount of cationic organic salt that is effective to precipitate said polymer.

DETAILED DESCRIPTION OF PREFERRED EMBODIMENTS

The anionic aqueous dispersions of the instant invention contain an anionic water-soluble or water-swellable polymer, preferably a vinyl-addition polymer. The anionic charge of the anionic polymer may vary over a broad range by containing from about 1 percent to about 100 percent anionic recurring units, by mole based on total moles of recurring units. The advantages of the instant invention are particularly apparent when the anionic charge is about 16 mole percent or greater than 16 mole percent, preferably about 17 mole percent or greater, 18 mole percent or greater, or 19 mole percent or greater, even more preferably about 20 mole percent or greater, 22 mole percent or greater, or 25 mole percent or greater, most preferably about 26 mole percent or greater, based on total moles of recurring units in the anionic polymer. The anionic polymer may contain 100 mole percent anionic recurring units or preferably about 90 mole percent or less, or more preferably about 80 mole percent or less, based on total moles of recurring units. Anionic recurring units may be formed by post-reaction of polymer, e.g. hydrolysis of polyacrylamide to form carboxylic acid or salt groups, or by hydroxamation with hydroxylamine or hydroxylamine salt to form hydroxamated polymer which contains hydroxamic acid and/or hydroxamic acid salt groups, see e.g. U.S. Pat. No. 4,767,540. Preferably, anionic recurring units are formed by polymerization of anionic monomers. Anionic monomers may include any anionic monomer including acrylic acid, methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, and ammonium and alkali metal salts thereof. Preferred anionic monomers include acrylic acid, methacrylic acid, 2-acrylamido-2-methylpropanesulfonic acid, and ammonium and alkali metal salts thereof.

The anionic water-soluble or water-swellable polymer may be a copolymer and may contain other anionic recurring units, cationic recurring units, or non-ionic recurring units. Cationic recurring units may be quaternary or acid salts of dialkylaminoalkyl(alk)acrylates or dialklyaminoalkyl(alk) acrylamides, or may be dialkyldiallylammonium halides and may be formed by copolymerization of the corresponding monomers or by post-reaction. To maintain a net anionic charge, the anionic polymers of the instant invention generally contain fewer cationic recurring units than anionic recurring units, and generally do not contain an amount of cationic recurring units that is effective to render the polymer insoluble in the salt solution at a pH or 5.1 or greater. The anionic polymers of the instant invention preferably contain 5 mole % or less of cationic recurring units, more preferably are substantially free of cationic recurring units, and are even more preferably substantially free of cationic recurring units that have been quaternized with large alky or aryl groups e.g. quaternized with $C_3$–$C_{12}$ alkyl halides. Most preferably, the anionic polymers of the instant invention are substantially free of benzyl group-containing cationic recurring units.

Non-ionic recurring units may be formed from water-soluble monomers such as (alk)acrylamide, N-vinylpyridine, hydroxyalkyl(meth)acrylates, N-vinylpyrrolidone, etc., preferably (meth)acrylamide, or may be formed from hydrophobic monomers having low water solubility so long as the inclusion of the poorly water-soluble, e.g. hydrophobic, recurring units does not render the resulting polymer water-insoluble or water-non-swellable. Nonionic recurring units may be formed by post reaction of the polymer. The anionic polymer may contain amounts of recurring units of water-soluble non-ionic monomers ranging from 0 percent to about 99 percent, preferably about 10 percent or greater, more preferably about 15 percent or greater, most preferably about 30 percent or greater, preferably about 90 percent or less, more preferably about 80 percent or less, most preferably about 70 percent or less, by mole based on total moles of recurring units in said polymer. The hydrophobic monomers may be hydrocarbon monomers, e.g. styrene, butadiene, 1-alkene, etc., other vinyl monomers, such as vinylhalide, other primarily aliphatic or aromatic compounds with polymerizable double bonds, or monomers with only moderate water solubility such as acrylonitrile. Preferably the hydrophobic monomers are alkyl(alk)acrylates or aryl(alk)acrylates in which the alkyl or aryl groups contain about 1 to about 12 carbon atoms such as methyl(meth)acrylate, ethyl(meth)acrylate, propyl(meth)acrylate, butyl(meth)acrylate, hexyl(meth) acrylate, ethylhexyl(meth)acrylate, or alkyl or aryl(alk) acrylamides in which the alkyl or aryl groups contain about 1 to 12 carbon atoms, such as methyl(meth)acrylamide, ethyl(meth)acrylamide, tributyl(meth)acrylamide, dimethyl (meth)acrylamide, hexyl(meth)acrylamide, ethylhexyl (meth)acrylamide, or aromatic (meth)acrylamide. The most preferred hydrophobic monomers are acrylonitrile, ethylacrylate and t-butylacrylamide. The anionic water-soluble or water-swellable polymer may contain amounts of hydrophobic non-ionic recurring units ranging from about 0 percent to about 15 percent, preferably about 2 percent to about 10 percent, by mole based on total moles of recurring units in said polymer. Although hydrophobic recurring units may be dilutive of the polymer effect in certain applications, inclusion in controlled amounts may advantageously affect a particular characteristic of the aqueous dispersion, e.g. solubility rate, bulk viscosity, cost, ease of processing, performance, etc. Depending on the specific embodiment, it may be preferable for the polymer to be devoid of hydrophobic recurring units, or to contain chosen amounts of hydrophobic recurring units so as to achieve an advantageous effect without disadvantageously increasing the dilutive effect.

Surprisingly, the instant inventors have discovered that the inclusion of certain recurring units, which may be referred to herein as insolubilizing anionic recurring units, in the anionic water-soluble or water-swellable polymers of the instant invention causes the resultant polymer to be insoluble in salt solutions, even when the total anionic content of the polymer is 16 percent or higher and even when the pH is 5.1 or higher. Thus, the anionic water-soluble or water-swellable polymers of the instant invention generally contain an amount of insolubilizing anionic recurring units that is effective to render the polymer Insoluble in the salt solution at a pH of 5.1 or above. Acrylic acid is not an insolubilizing anionic recurring unit but, surprisingly, other anionic recurring units may have an insolubilizing effect. The insolubilizing anionic recurring units may be any anionic recurring units which have the effect of rendering the anionic polymer insoluble at a pH of 5.1 or higher in a salt solution. Preferably, the insolubilizing anionic recurring units are selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof. Generally, at least about 20 percent of the anionic recurring units in the anionic water-soluble or water-swellable polymers of the instant invention are comprised of insolubilizing anionic recurring units, preferably about 25 percent or more, more preferably about 30 percent or more. For example, if the anionic polymer contains 50 mole % anionic recurring units and 50 mole % nonionic recurring units, it is preferred that at least about 20 mole % of those anionic recurring units, i.e. 10 mole % of the total recurring units in the polymer, be insolubilizing anionic recurring units.

Greater amounts of insolubilizing anionic recurring units generally render the resultant anionic polymer more insoluble in the salt solution at a pH of 5.1, so that e.g. higher pH levels or lower salt levels may be achievable with greater amounts of insolubilizing anionic recurring units than with lesser amounts. The inclusion of these insolubilizing anionic recurring units also allows the resultant anionic water-soluble or water-swellable polymer to contain an even greater level of anionic charge so that as larger amounts of insolubilizing recurring units are incorporated into the polymer, ever higher levels of anionic charge can be achieved. The effective level of insolubilizing anionic recurring unit is generally found by routine experimentation, and may be chosen in concert with the choice of total anionic charge in the polymer and salt level in the aqueous dispersion. Methacrylic acid, 2-acrylamido-2-methylpropanesulfonic acid, styrenesulfonic acid, ammonium or alkali metal salts thereof, and mixtures thereof are preferred insolubilizing anionic recurring units, and methacrylic acid and its salts are particularly preferred.

The anionic charge of the anionic polymer that is contained in the aqueous dispersions of the instant invention may result from a combination of anionic monomer polymerization and post-reaction. For example, an aqueous dispersion containing a polymer having an anionic charge of greater than 16 mole % may be formed by first copolymerizing acrylamide and an insolubilizing anionic monomer such as methacrylic acid to form a copolymer containing e.g. 95 mole % acrylamide recurring units and 5 mole % methacrylic acid units, then post-reacting the polymer by hydrolyzing a portion of the acrylamide recurring units to form acrylic acid recurring units, so that the resulting polymer has a total anionic charge of greater than 16 mole %. Thus, the process for making the instant aqueous dispersions which comprises polymerizing vinyl-addition monomers to form an anionic water-soluble or water-swellable polymer having greater than 16 mole % of anionic recurring units may be achieved by first forming a polymer which has less than 16 mole % anionic recurring units, then post-reacting that polymer to produce a polymer having greater than 16 mole % anionic recurring units.

The amount of the anionic water-soluble or water-swellable polymer in the aqueous dispersion is generally as high as practicable, taking into account the effect of high polymer solids on bulk viscosity, preferably about 5 percent or greater, more preferably about 10 percent or greater, most preferably about 20 percent or greater, by weight based on the total weight of the aqueous dispersion. Generally, the polymer solids are not increased above an amount which increases the bulk viscosity to an unusable level. Practically the amount of anionic polymer in the aqueous dispersion is about 75 percent or less, preferably about 60 percent or less, more preferably about 50 percent or less, by weight based on total weight. The weight average molecular weight of the anionic polymer in the aqueous dispersion is not critical and depends on the application, but is generally higher than about 100,000, preferably greater than about 1 million, more preferably greater than about 2 million, most preferably greater than about 5 million. As discussed herein, molecular weights of polymers are weight average and may be determined by means known to those skilled in the art, preferably by light scattering or by high pressure size exclusion chromatography using a light scattering detector or appropriately calibrated with standards of known molecular weight.

The aqueous dispersions of the instant invention are generally comprised of a discontinuous phase of small polymer-containing droplets that are dispersed in the aqueous continuous phase, although, of course, minor amounts of the polymer may be found in the continuous phase. Thus, the anionic water-soluble or water-swellable polymer generally constitutes more than 25 percent, preferably more than 50 percent, of the total weight of a typical small aqueous droplet. The aqueous dispersions of the instant invention are preferably formed by polymerization of the corresponding monomers in the aqueous salt solution, but may also be formed by adding gelled polymer or dry polymer e.g. spray-dried polymer or agglomerates to the aqueous salt solution. Although aqueous dispersions prepared by polymerization of monomers as herein described may sometimes have an average droplet size of about 30 microns or more, the average droplet size is generally less than about 30 microns, preferably less than about 20 microns, more preferably about 15 microns or less. Droplet size of a non-spherical droplet is the length along a major axis. Droplet size and shape tend to be a function of reactor conditions, such as stirring rate, reactor configuration, type of stirrer, etc. Preferably the size of the droplets is chosen by carrying out the polymerization in the presence of one or more insoluble polymer seeds, said polymer seeds being insoluble in an aqueous solution having the same inorganic salt concentration as said aqueous dispersion. Increasing the seed concentration tends to lower the peak bulk viscosity observed during the polymerization process and/or decrease the droplet size. Preferably said polymeric seeds are the residue of a prior polymerization.

The aqueous dispersions of the instant invention may contain a second water-soluble polymer, preferably a vinyl-addition polymer that is different from said first water-soluble or water-swellable anionic polymer. The second polymer has a tendency to stabilize the aqueous droplets of the first anionic polymer when it is soluble or partially soluble in the aqueous salt solution. The second water-soluble polymer may be referred to herein as a dispersant or polymer dispersant. The dispersant may be a non-ionic polymer but is preferably an anionic polymer or copolymer. The dispersant generally has the same characteristics as the anionic polymer that is contained in the dispersed phase as described above, except that it preferably has greater solubility in the aqueous salt solution. Greater solubility generally results from lower molecular weight and/or greater incorporation of anionic recurring units and/or lesser inclusion of hydrophobic recurring units. Most preferably the second polymer is a copolymer of acrylamide and acrylic acid or a homopolymer of acrylic acid. The characteristics of the dispersant are generally chosen by means of routine experimentation to provide the most advantageous effect, e.g. bulk viscosity, performance, costs, etc. Dispersant molecular weights are generally higher than about 10,000, preferably greater than about 50,000, more preferably greater than about 100,000 and most preferably greater than about 200,000. Generally, the dispersant molecular weight should not be so high that it viscosities the continuous phase to an unacceptable level. Preferably, the dispersant molecular weight is less than about 5,000,000, more preferably less than about 3,000,000. The dispersant is generally dissolved in the aqueous continuous phase of the anionic aqueous dispersion, although of course minor amounts may be found in the discontinuous phase.

The amount of dispersant in the instant aqueous dispersions is generally chosen to control aqueous dispersion properties, e.g. performance, bulk viscosity, charge, molecular weight, solubility rate, physical stability, e.g., setting, etc. The instant anionic aqueous dispersions do not require a dispersant, but aqueous dispersions which contain dispersants are preferred. Generally, preferred aqueous dispersions contain about 1 percent or more, preferably about 2 percent or more, even more preferably about 5 percent or more, of a dispersant, by weight, based on the amount of the first anionic water-soluble or water-swellable polymer. The second polymer must not be present in amounts which would cause the precipitation or phase separation of the first polymer in the absence of salt. In other words, the first water-soluble or water-swellable anionic polymer is insolubilized by the action of the salt and not because of incompatibility with the second anionic polymer. Even in the absence of the second polymer, the first polymer is still insoluble in the salt solution. Practically, this often means that the amount of dispersant in the aqueous dispersion is about 20 percent or less, preferably about 15 percent or less, by weight, based on the amount of the first anionic water-soluble or water-swellable polymer. In practice, the amount of dispersant may be found by routine experimentation, and different amounts would ordinarily be used depending on the identity of the first and second polymers, the total polymer solids level, the bulk viscosity, costs, ease of production, product performance, etc.

The aqueous dispersions of the instant invention may contain additional anionic water-soluble or water-swellable polymers that are different from the first or second polymers. The additional polymer(s) may also be contained in droplets dispersed in the aqueous salt solution, in which case it may be described as discussed above for the first anionic polymer. The additional polymer(s) may also be dissolved in the aqueous solution along with the dispersant, in which case it may be described as discussed above for the second polymer. Preferably the additional polymers are anionic. The aqueous dispersions of the instant invention may be formed by blending two or more aqueous dispersions. Blending may be advantageous to achieve a balance of properties exhibited by the individual aqueous dispersions, e.g. performance, charge, total polymer solids, costs, molecular weight, etc. A molecular weight of the aqueous dispersion, as that term is used herein, is simply the weight average molecular weight of the polymers contained therein, obtained by subjecting the entire dispersion to a suitable molecular weight characterization technique, e.g. light scattering Since the aqueous dispersion contains two or more different polymers, each of which may have a molecular weight and molecular weight distribution different from the others, the molecular weight distribution of the aqueous dispersion may be multimodal. The molecular weight of the aqueous dispersion is generally about 500,000 or greater, preferably greater than 1 million, more preferably about 2 million or greater, most preferably about 3 million or greater.

In some cases it may be more convenient to characterize the polymers or aqueous dispersions discussed herein in terms of standard viscosity instead of by molecular weight. As used herein "standard viscosity" is determined by: diluting an aqueous dispersion with water to form a aqueous admixture (in the case of water-swellable polymers) or solution (in the case of water-soluble polymers) having a polymer concentration of about 0.2 percent; mixing together 8.0 grams of this aqueous admixture or solution with 8.6 grams of 2 molar NaCl solution; and then measuring the viscosity of the resultant mixture at 20° C. using a rotating cylinder viscometer, e.g. Brookfield viscometer, equipped with a UL adapter at 60 rpm. The standard viscosities of the aqueous dispersions and anionic polymers of the instant invention are generally about 1.1 centipoise or greater, preferably about 1.5 centipoise or greater, more preferably about 2.0 centipoise or greater, most preferably about 2.5 centipoise or greater depending on the application.

The aqueous dispersions of the instant invention generally contain an inorganic salt. The type and amount of salt are generally chosen to be effective to precipitate the anionic water-soluble or water-swellable polymer so as to form the aqueous droplets of the aqueous dispersion. Generally, the amount of salt is about 5 percent or greater, preferably about 10 percent or greater, more preferably about 15 percent or greater, and most preferably about 20 percent or greater, by weight, based on the weight of the aqueous dispersion. The upper limit to salt concentration is generally the saturation limit for the particular salt in question, because it is generally undesirable for the aqueous dispersion to contain large amounts of undissolved salt, although small amounts can be tolerated. Thus, the anionic aqueous dispersions of the instant invention generally contain 40% or less, preferably 35% or less, most preferably 30% or less of inorganic salt, by weight based on the weight of the aqueous dispersion. Salt levels are generally chosen to favorably influence product attributes such as cost, bulk viscosity, etc. In practice, the salt level is generally that which is effective to produce a desired result such as a particular bulk viscosity or solids level, and may be determined by routine experimentation, e.g. balancing the tendency for positive product attributes against the negative aspects of salt use, e.g. cost and dilutive effect. The inorganic salt may be any inorganic salt, preferably a kosmotropic salt, e.g. chloride, sulfate, phosphate or hydrogen phosphate salt, more preferably ammonium sulfate, sodium chloride, and sodium sulfate, most preferably sodium sulfate and ammonium sulfate. The counter ion may be any counter ion, e.g. group IA and group IIA metal ions, ammonium, etc., preferably ammonium, sodium, potassium and magnesium. Mixtures of salts may be used.

The pH of the aqueous dispersion may be determined by any convenient means, e.g. a pH meter, as described in the examples below. Generally, the process for making the aqueous dispersion of the instant invention may be conducted at any convenient pH, preferably between pH 1 and pH 7, more preferably at a pH of 5.0 or greater or 5.1 or greater, even more preferably at a pH of 5.3 or greater or 5.5 or greater, most preferably at a pH of 6.0 or greater. When the pH of the aqueous dispersions of the instant invention is 5.1 or is adjusted to a test pH of 5.1, the aqueous dispersions maintain their form, i.e. remain in the form of an aqueous dispersion in which the anionic water-soluble or water-swellable polymer remains insoluble. Preferably, the polymer remains insoluble at a test pH of 5.3 or 5.5, or even more preferably at a pH of 5.8 or 6.0. For the purposes of the instant invention, a water-swellable polymer is insoluble in a particular salt solution at a particular pH when the water-swellable polymer is substantially unswollen. By comparison, an anionic water-swellable polymer having an anionic charge of greater than 15 mole % and not containing effective amounts of insolubilizing recurring units as discussed above is generally substantially swollen at a pH of 5.1 or greater, for the same reason that the corresponding water-soluble polymer is soluble under the same conditions.

When the water-soluble or water-swellable polymer is insoluble, the aqueous dispersion generally appears opaque e.g appears milky-white and is not clear or translucent. For the purposes of the instant invention, a convenient means for determining whether the anionic water-soluble or water-swellable polymer is insoluble at a particular pH is to adjust the pH of the aqueous dispersion to the test pH, and then to measure the bulk viscosity of the aqueous dispersion at that pH. Generally, the adjustment of the pH will not result in a large change in bulk viscosity, preferably less than 50 percent change, more preferably less than 25 percent change, most preferably less than 10 percent change. Preferably, the bulk viscosity of the aqueous dispersion at the test pH is between about 100 centipoise and about 100,000 centipoise, even more preferably between about 500 centipoise and about 50,000 centipoise, and most preferably between about 1,000 and about 30,000 centipoise. Bulk viscosity may be measured by any convenient means, preferably using a rotating cylinder viscometer, e.g. Brookfield viscometer, at a temperature of 20 ° C. as described in the examples below.

Aqueous dispersions of water-soluble polymers are preferably formed by polymerization of the corresponding monomers in an aqueous inorganic salt solution to form the first anionic water-soluble polymer, preferably in the presence of at least one second anionic water-soluble polymer. Polymerization may be effected by any initiating means, including redox, thermal or irradiating types. Examples of preferred initiators are 2,2'-azobis(2-amidino-propane) dihydrochloride, 2,2'-azobis(isobutyronitrile), sodium bromate/sulfur dioxide, potassium persulfatelsodium sulfite, and ammonium persulfate/sodium sulfite, as well as peroxy redox initiators, e.g. those disclosed in U.S. Pat. No. 4,473,689. Initiator levels are chosen in a known manner so as to create polymers of the desired molecular weight. Amounts of chain transfer agents, e.g. isopropanol, lactic acid, mercaptoethanol, etc. and branching or crosslinking agents, e.g. methylenebisacrylamide, glycidyl methacrylate, etc. may be added in a known manner to further adjust the properties of the anionic water-soluble or water-swellable polymer. Depending on the production conditions, e.g. types and relative amounts of chain transfer agent and branching agent, water-swellable or branched, water-soluble polymers may be formed. In general, the use of greater amounts of branching or crosslinking agent increases the tendency for the product to be water-swellable instead of water-soluble, and increased amounts of chain transfer agent tend to reduce molecular weight. When chain transfer agent and branching agent are used together, water-swellable products are more likely to be obtained at high branching agent and low chain transfer agent levels, whereas branched, water-soluble polymers may be obtained at high chain transfer and low branching agent levels.

Polymerization process components may be added at any time; e.g. all of the monomers may be present from the onset of the polymerization, or monomers may be added during the course of the polymerization. In some cases it may be preferred. to add the monomers over the course of the polymerization to reduce compositional drift and/or because the monomers may themselves have a solubilizing effect on the polymer. Preferably, about 10–60 weight percent, more preferably 20–50 weight percent, of the total monomer charge is present at the onset of polymerization, and the remaining monomer is added either continuously or batchwise, preferably continuously, over the course of the polymerization. Likewise, all of the salt may be present from the onset of the polymerization, or salt may be added during the course of the polymerization or after polymerization is complete. Typical polymerization parameters e.g. temperature and time may be chosen in a known manner, and may be varied during the course of the polymerization. Polymerization is generally effected in the presence of an inert gas, e.g. nitrogen. Conventional processing aids, e.g. chelating agents, sequesterants, etc., may be added as required.

The aqueous dispersions of the present invention have advantageous aspects in that they are preferably substantially free of dilutive substances such as surfactant, emulsifier, oil, hydrocarbon liquids, organic solvents, etc. Although viscosity-reducing additives, e.g. glycerin, glycerol, alcohol, glycol, etc., may be present in the aqueous dispersions, amounts should be 2% or less, more preferably 1% or less, most preferably 0.1% or less, in order to maintain the advantageous properties of the invention. Although small amounts of surfactants or emulsifiers may be added, their presence is generally unnecessary to the formation of the instant aqueous dispersions. Preferably, the instant aqueous dispersions contain less than 1% of surfactant or emulsifier, and are more preferably substantially free of surfactant or emulsifier. Small amounts of cationic organic salts may be used to render the anionic polymer less soluble, which may have the effect of allowing for greater polymer solids, reduced inorganic salt levels, etc. Since the cationic organic salt may have a dilutive effect and may add cost to the formulation, it is generally preferred that the aqueous dispersions of the instant invention contain less than about 1% of catonic organic salt, based on the total weight of the aqueous dispersion, and more preferably less than the amount which is effective to precipitate the anionic polymer. Most preferably, the aqueous dispersions of the instant invention are substantially free of cationic organic salt.

In some cases, conventional oil-in-water emulsions or microemulsions of water-soluble or water-swellable polymers may present a problem in that the presence of oil and surfactants and/or emulsifier may present a secondary pollution problem for the end-user. The instant aqueous dispersions may provide a solution to this problem because they generally contain no oil and little or no surfactant. The instant aqueous dispersions may be blended with conventional oil-in-water emulsions or microemulsions of water-soluble or water-swellable polymers to produce a product having lower oil and/or surfactant and/or emulsifier content than the corresponding oil-in-water emulsions or microemulsions.

Waters used in the present invention may be from any source, e.g. process water, river water, distilled water, tap water, etc. Preferably, polymerizations are conducted in aqueous solutions that do not contain substantial amounts of materials which detrimentally affect the polymerization. Advantageously, the aqueous dispersions of the present invention tend to dissolve quickly when diluted with water.

The aqueous dispersion of the instant invention may be dehydrated to increase the total polymer solids content, or to create substantially dry products. Any means known in the art, e.g. stripping, spray drying, solvent precipitation, etc., may be used to reduce the water content. Surprisingly, partial dehydration may reduce the bulk viscosity of an aqueous dispersion, in spite of the tendency for dehydration to increase polymer solids. Dehydration may be performed by heating, preferably under reduced pressure, although of course excessive heating may be detrimental to polymer properties. A substantially dry mass of polymer may be obtained by removal of water, and the mass may be comminuted to create a powdery, particulate, or granular product.

Dry anionic water-soluble or water-swellable may have the useful property of being redispersible in a salt solution at high pH so as to from an aqueous dispersion or admixture. This property may be of particular value to an end-user because the dry product may be less expensive to ship to a remote site and store at that site than the corresponding aqueous dispersion because the dry product typically has a lower weight and volume. The advantageous handling properties of the aqueous dispersion may be obtained at the site by simply mixing the dry polymer with a salt solution, under the conditions described above e.g. salt concentration and pH, to form an aqueous dispersion or admixture which may be conveniently pumped or worked prior to being utilized in the application.

Surprisingly, substantially dry polymer products may be obtained by spray-drying the aqueous dispersions of the instant invention. Oil-containing polymer emulsions and dispersions have been spray-dried, see e.g. U.S. Pat. No. 4,035,317; U.S. patent application Ser. Nos. 08/668,288; 08/667,782; 08/670,194; and references therein, as well as cationic aqueous dispersions, see U.S. Pat. No. 5,696,228. However, spray-drying of anionic aqueous dispersions has not previously been reported. In accordance with the instant invention, anionic aqueous dispersions may be sprayed-dried by a suitable means into a large chamber through which a hot gas is blown, thereby removing most or all of the volatiles and enabling the recovery of the dried anionic polymer. Surprisingly, the means for spraying the anionic aqueous dispersion into the gas stream are not particularly critical and are not limited to pressure nozzles having specified orifice sizes; in fact, any known spray-drying apparatus maybe used. For instance, means that are well known in the art such rotary atomizers, pressure nozzles, pneumatic nozzles, sonic nozzles, etc. can all be used to spray-dry the aqueous dispersion into the gas stream. The feed rate, feed viscosity, desired particle size of the spray-dried product, droplet size of the aqueous dispersion, etc. are factors which are typically considered when selecting the spraying means. The size and shape of the chamber, the number and type of spraying means, and other typical operational parameters may be selected to accommodate dryer conditions using common knowledge of those skilled in the art.

Although closed cycle spray-dryers may be used, open cycle spray-drying systems are preferred. Gas flow may be cocurrent, countercurrent or mixed flow, cocurrent flow being preferred. The hot gas, or inlet gas, may be any gas that does not react or form explosive mixtures with the feed and/or spray-dried polymer. Suitable gases used as the inlet gas are gases known to those skilled in the art, including air, nitrogen, and other gases which will not cause undesirable polymer degradation or contamination, preferably gases containing about 20% or less oxygen, more preferably about 15% or less oxygen. Most preferably, inert gases such as nitrogen, helium, etc. that contain about 5% or less of oxygen should be used. The dried anionic polymer may be collected by various means such as a simple outlet, classifying cone, bag filter, etc., or the polymer may be subjected to further stages of drying, such as by fluid beds, or agglomeration. The means. for collecting the dry polymer product is not critical.

There are four interrelated operating parameters in the instant spray-drying process: gas inlet temperature, gas outlet temperature, product volatiles and residence time in the dryer. The outlet temperature generally should be about 150° C. or below, preferably about 120° C. or below, more preferably less than 100° C., even more preferably about 95° C. or below, most preferably about 90° C. or below. The outlet temperature is generally about 70° C. or higher, preferably about 75° C. or higher. Therefore, outlet temperatures are generally about 70° C. to about 150° C., preferably about 70° C. to about 120° C., more preferably about 70° C. to less than 100°, even more preferably about 70° C. to about 95° C., most preferably about 75° C. to about 90° C. Outlet temperatures below about 70° C. may be suitable in certain instances, though generally this is less preferred. For instance, at the cost of efficiency, spray drying could be carried out at long residence times, high gas flow rates and low outlet temperatures. Generally, the dryer should be operated at the lowest possible outlet temperature consistent with obtaining a satisfactory product. Preferably, the polymers are not degraded by the instant spray-drying process e.g. the standard viscosity of the spraydred polymer is reduced by less than 15%, preferably by less than 10%, even more preferably by less than 5%, by the spray-drying process, as compared to the standard viscosity of the aqueous dispersion from which the spray-dried polymer is derived.

The inlet temperature, the feed rate, and the composition of the anionic aqueous dispersions may all affect outlet temperatures. These parameters may be varied to provide a desired outlet temperature. Feed rates are not critical, and generally will vary depending on the size of the dryer and the gas flow rate. Inlet gas temperature is less critical than outlet gas temperature, and is generally about 140° C. or above, preferably about 160° C. or above. The inlet gas temperature is preferably about 200° C. or below and more preferably about 180° C. or below. Thus, preferred inlet gas temperature ranges from about 140° C. to about 200° C., more preferably from about 160° C. to about 180° C. Proper inlet gas temperatures tend to avoid product degradation on the high side and to avoid inadequate drying on the low side.

Residence time is a nominal value obtained by dividing the volume of the dryer by the volumetric gas flow. Residence time is generally at least about 8 seconds, preferably at least about 10 seconds. Residence time is generally no more than about 120 seconds, preferably no more than about 90 seconds, more preferably no more than about 60 seconds, and most preferably no more than about 30 seconds. Therefore, the general range of residence time is about 8 to about 120 seconds, preferably about 10 to about 90 seconds, more preferably about 10 to about 60 seconds, and most preferably about 10 to about 30 seconds. It is known to those skilled in the art that longer residence times are to be expected when larger dryers are used or when the dryer is run in a less efficient manner. For instance, at the cost of efficiency, longer residence times would be expected at very low inlet temperatures and slow gas flow rates. As a practical matter, the residence times useful in the present invention may vary from the values described above, depending on the size and type of spray dryer used, the efficiency at which it is operated, and other operational parameters. Thus, residence times specified herein may be modified to accommodate dryer conditions using common knowledge of those skilled in the art.

When produced according to the spray drying processes disclosed herein, the anionic polymer particles of the instant invention are generally about 10 microns or greater in diameter, preferably about 40 microns or greater, more preferably about 100 microns or greater, most preferably about 200 microns or greater. It is preferred that the anionic polymer particles be non-dusting. Dusting and flow problems are typically exacerbated when the polymer particles are small, so larger polymer particles are generally desirable.

However, very large particles may dissolve more slowly. Therefore, it is generally desirable for the anionic polymer particles to be about 1200 microns or less in diameter, preferably about 800 microns or less in diameter, more preferably about 600 microns or less, most preferably about 400 microns or less. Generally, at least about 90% of the polymer particles range in size from about 10 microns to about 1200 microns, preferably at least about 95%, more preferably at least about 98%. The size of the anionic polymer particles can be varied somewhat by altering the operational parameters e.g. spray configuration, aqueous dispersion viscosity, feed rate, etc. Particles may be substantially spherical or non-spherical; "diameter" of a non-spherical particle is the dimension along a major axis.

Although in some cases the anionic polymer particles are hollow, porous structures having at least one opening in their walls, it has been discovered that these features are not always necessary in order to obtain particles having desirable properties e.g. fast dissolution times. In many cases, the spray-drying parameters e.g. nozzle type, nozzle size, outlet temperature, etc. needed to produce particles that are hollow, porous structures having at least one opening in their walls are inconvenient or uneconomical, and it is advantageous to produce particles that lack some or all of these features.

The anionic polymer particles formed by the spray-drying processes of the instant invention may be screened to remove an oversize or undersize fraction. Oversize particles may be fragmented by e.g. grinding, whereas undersized particles are generally agglomerated. Sizes may be determined by methods known to those skilled in the art e.g. sieving, screening, light scattering, microscopy, microscopic automated image analysis, etc.

Surprisingly, the bulk densities of the spray-dried anionic polymer particles of the instant invention are generally greater than the bulk densities of dry polymers prepared by precipitation of e.g. water-in-oil emulsions of the same polymer. Anionic polymer particles having greater density may be advantageous because they occupy a smaller volume, resulting in e.g. lower shipping and storage costs. Whereas the densities of precipitated polymers are usually less than about 0.35 grams per cubic centimeter (g/cc), the bulk densities of the spray-dried anionic polymer particles of the instant invention are generally about 0.35 g/cc or greater, preferably about 0.4 g/cc or greater, more preferably about 0.45 g/cc or greater, most preferably about 0.50 g/cc or greater. The bulk densities of the spray-dried anionic polymer particles of the instant invention are generally about 1.1 g/cc or less, preferably about 1.0 g/cc or less, more preferably about 0.95 g/cc or less, most preferably about 0.90 g/cc or less. Therefore, the bulk densities of the spray-dried anionic polymer particles of the instant invention generally range from about 0.35 to about 1.1 g/cc, preferably about 0.4 to about 1.0 g/cc, more preferably about 0.45 to about 0.95 g/cc, most preferably about 0.50 to about 0.90 g/cc.

Under the conditions of drying set forth herein, the anionic polymer particles produced by the processes described herein are substantially dry. As used to describe the polymer produced herein, "substantially dry" generally means that the polymer contains about 12% or less volatiles, preferably about 10% or less by weight, based on the weight of the spray dried polymer. The polymer generally contains about 2% or more volatiles, preferably about 5% or more, by weight based on total weight, and most preferably contains from about 8% to about 10% volatiles by weight, same basis. The volatiles are measured by determining the weight loss on drying the polymer product at about 105° C. for about 30 minutes.

It has also been discovered that agglomeration of the anionic polymer particles of the instant invention may improve the flow properties and dissolution times of the polymers. Agglomeration is a known process for increasing particle size and various methods for agglomerating particles are known to those skilled in the art, e.g. "Successfully Use Agglomeration for Size Enlargement," by Wolfgang Pietsch, *Chemical Engineering Progress*, April 1996, pp. 2945; "Speeding up Continuous Mixing Agglomeration with Fast Agitation and Short Residence Times," by Peter Koenig, *Powder and Bulk Engineering*, February 1996, pp. 67–84. Known agglomeration methods such as natural agglomeration, mechanical agglomeration, tumble or growth agglomeration, pressure agglomeration, binderless agglomeration, agglomeration with binders, etc. may be used to agglomerate the polymer particles of the instant invention. Agglomeration may optionally be followed by drying e.g. fluid bed drying, to remove binder e.g. water. Pressure agglomeration is preferred, and mechanical agglomeration using a water binder, followed by fluid bed drying is most preferred.

The agglomerates formed by agglomerating the anionic polymer particles of the instant invention tend to have improved flow properties and faster dissolution times when compared to the unagglomerated polymer particles. Preferably, the agglomerates are non-dusting. Typically, about 90% of the agglomerates of the instant invention have an agglomerate size of about 120 microns or greater, preferably about 160 microns or greater, more preferably about 200 microns or greater, most preferably about 300 microns or greater. Generally, about 90% of the agglomerates have an agglomerate size of about 1500 microns or less, preferably about 1200 microns or less, more preferably about 1100 microns or less, most preferably about 1000 microns or less. Thus, about 90%, preferably 95%, of the agglomerates have a size in the range of about 120 to about 1500 microns, preferably about 160 microns to about 1200 microns, more preferably about 200 microns to about 1100 microns, most preferably about 300 microns to about 1000 microns Usually, at least about 5% of the agglomerates, preferably at least about 10%, most preferably at least about 15%, are larger than about 900 microns. The agglomerates formed by agglomerating the spray-dried anionic polymer particles of the instant invention may be screened to remove an oversize or undersize fraction. Preferably, agglomerates larger than about 1200 microns and smaller than about 175 microns are removed by e.g. screening. Oversize agglomerates are generally fragmented by e.g. grinding, whereas undersized agglomerates are generally recycled into the agglomerator.

The bulk density values of the agglomerates of the instant invention tend to be lower than the bulk density values of the spray-dried anionic polymer particles from which they are formed. The bulk densities of the agglomerates of the instant invention are generally about 0.35 g/cc or greater, preferably about 0.4 g/cc or greater, more preferably about 0.45 g/cc or greater, most preferably about 0.50 g/cc or greater. The bulk densities of the agglomerates of the instant invention are generally about 1.0 g/cc or less, preferably about 0.95 g/cc or less, more preferably about 0.90 g/cc or less, most preferably about 0.85 g/cc or less. Therefore, the bulk densities of the agglomerates of the instant invention generally range from about 0.35 to about 1.0 g/cc, preferably about 0.4 to about 0.95 g/cc, more preferably about 0.45 to about 0.90 g/cc, most preferably about 0.50 to about 0.85 g/cc.

In order to obtain agglomerates of a preferred size, it is preferred that the polymer particles themselves be of such a size that they are agglomerable. Agglomeration obviously tends to multiply the average particle size, so that it is frequently easier to cause large increases in particle size than it is to cause small increases in particle size. Therefore, to produce agglomerates of a preferred size or size range, it is generally preferred to agglomerate particles that are much smaller than the desired agglomerate size, rather than particles that are only slightly smaller. Agglomerable particles are generally those that may be conveniently agglomerated to produce agglomerates having a preferred size. It is possible, but less preferred, to agglomerate larger particles to produce agglomerates that are larger than desired, then remove the oversize agglomerates as described above.

The substantially dry polymer particles and agglomerates of the present invention are generally comprised of the polymer that was contained in the anionic aqueous dispersion that was spray-dried, as discussed hereinabove.

As discussed above, the anionic aqueous dispersions of the instant invention may contain more than one anionic polymer, e.g. may contain a polymer dispersant or may result from blending of two or more anionic aqueous dispersions. Spray-drying of these anionic aqueous dispersions may be advantageous because typicaly 90% or greater, preferably 95% or greater, most preferably substantially all, of the resultant spray-dried polymer particles each individually contains two or more water-soluble or water-swellable vinyl-addition polymers, so that stratification effects may be minimized. Stratification may occur when two different dry polymers having differing particle sizes or particle size distributions are blended together because of the tendency for the larger particles to settle towards the bottom of the container. Stratification on storage may affect blend product performance as the top of the container tends to become enriched in the polymer having the smaller particle size. For obvious reasons, changes in product performance as a function of storage depth are to be avoided, and it is generally preferred that each polymer in a blend be of similar particle size, see e.g. EP 479 616 A1 and U.S. Pat. No. 5,213,693. A dry blend of the two different polymers is likely to exhibit greater stratification than a dry blend obtained by spray-drying anionic aqueous dispersions comprised of the same two anionic polymers because the majority of the spray-dried polymer particles will each individually contain two or more anionic water-soluble or water-swellable polymers.

Suspensions of dispersed solids may be advantageously dewatered by the practice of the instant invention. The dewatering process may be carried out by intermixing an aqueous dispersion of polymers, or dry polymer, or aqueous admixture of the dispersion, or aqueous admixture of the dry polymer, in an amount effective for flocculation, with a suspension of dispersed solids, and dewatering the suspension of dispersed solids. Surprisingly, both the anionic aqueous dispersions of the instant invention and the spray-dried anionic polymer particles and agglomerates of the instant invention tend to disperse and/or dissolve faster than corresponding conventional water-in-oil emulsions of similar polymers or spray-dried polymers produced therefrom, respectively. Typically, the aqueous dispersion of polymers, or dry polymer, or aqueous admixture of the dispersion, or aqueous admixture of the dry polymer, acts to flocculate the dispersed solids so that the dewatering rate is materially increased compared to when the polymer is not used. Polymer dosages are generally chosen to be effective to flocculate the solids and may be found by routine experimentation in a manner known to those skilled in the art. Typical polymer dosages range from about 0.01 to about 5 pounds of polymer, preferably about 0.1 to about 3 pounds of polymer, per dry ton of flocculated solids.

Examples of suspensions of dispersed solids which may be dewatered by means of the instant invention are dispersed mineral solids, dispersed cellulosic solids, and dispersed biological solids. Oily or foul water may also be clarified by the practice of the instant invention. Preferably, the dispersed solids are comprised of alumina, red mud, or silica; paper solids, or municipal or industrial wastewater. Because of the advantageous aspects of the invention e.g. substantially oil-free, minimum amounts of inactive diluents, little or no surfactant, etc., the polymers may be especially well-suited to situations where part or all of the dewatered solids or clarified water is returned to the environment, such as sludge composting, land application of sludge, pelletization for fertilizer application, release or recycling of clarified water, papermaking, etc. The instant polymers may be used to flocculate food waste and may be feed additives. Other applications which may benefit from the advantageous aspects of the instant inventions include soil amendment, reforestation, erosion control, seed protection/growth, etc., where the aqueous dispersion or dry polymer, preferably an aqueous admixture thereof, is advantageously applied to soil.

Other examples of suspensions of dispersed solids which may be dewatered by means of the instant invention are found in the papermaking area, e.g. the aqueous dispersions or dry polymer may be used as retention aids, drainage aids, formation aids, washer/thickener/drainage production aid (DNT deink application), charge control agents, thickeners, or for clarification, deinking, deinking process water clarification, settling, color removal, or sludge dewatering. The polymers of the instant invention may also be used in oil field applications such as petroleum refining, water clarification, waste dewatering, oil removal and oil production.

Dewatering and clarification applications for the aqueous dispersions and dry polymers of the instant invention may also be found in the food processing area, including waste dewatering, preferably waste dewatering of poultry beef, pork and potato, as well as sugar decoloring, sugar processing clarification, and sugar beet clarification. The flocculated food solids are not necessarily waste, and may find further use e.g. as animal feed.

Mining and mineral applications for the aqueous dispersions and dry polymers of the instant invention include coal refuse dewatering and thickening, tailings thickening, and Bayer process applications such as red mud settling, red mud washing, Bayer process filtration, hydrate flocculation, and precipitation.

Biotechnological applications for the aqueous dispersions and dry polymers of the instant invention include dewatering and clarification of wastes and preferably, dewatering and clarification of fermentation broths. The instant aqueous dispersions may also be used as thickeners e.g. as printing ink thickeners.

The aqueous dispersions of the instant invention may be employed in the above applications alone, in conjunction with, or serially with, other known treatments.

All patents, patent applications, and publications mentioned above are hereby incorporated herein by reference. Unless otherwise specified, all percentages mentioned herein are understood to be on a weight basis.

Bulk viscosity (BV) values in the following examples were measured at 20° C. using a Brookfield Viscometer equipped with the appropriate size spindle. Viscosity values are reported in units of centipoise (cps). Any Standard Viscosity (SV) values in the following Examples were determined by diluting the polymer composition e.g. aqueous dispersion with water to form a 0.2 wt. % polymer admixture in water, mixing together 8.0 g of this admixture and 8.6 g of 2M NaCl, then measuring the viscosity of the resultant admixture at 20° C. using a rotating cylinder viscometer (Brookfield Viscometer) equipped with a UL adapter at 60 rpm. Molecular weights were determined by high performance size exclusion chromatography using a light scattering detector or an ultraviolet detector calibrated with poly(acrylic acid) standards.

All pH values in the Examples below were measured with a ROSS Combination pH Electrode-8102BN connected to an Orion Model 520A pH meter, by immersing the electrode in the sample. Calibration of the pH meter was conducted with both pH 4.0 and pH 7.0 buffer solutions.

EXAMPLE 1C

Preparation of Dispersant A (~25 wt. % polymer solution of a 5 mole % acrylamide and 95 mole % acrylic acid copolymer): To a suitable reaction vessel equipped with stirring means, a thermocouple, and a nitrogen sparging system was charged about 774.57 grams (g) of de-ionized water, about 38.49 grams of a 54.5% solution of acrylamide (AMD), about 15 grams of 5% ethylenediaminetetraacetic acid, disodium salt dihydrate (EDTA) solution (chelating agent), and about 408.11 grams of 99% acrylic acid (AA). The pH of the resulting monomer solution was adjusted to about 5.75 by the addition of about 303.66 grams of a 30% ammonium hydroxide solution. The monomer solution was then sparged with nitrogen while cooling down to about 6° C. After about 40 minutes, about 67.29 grams of a 30% ammonium persulfate solution and about 67.29 grams of 30% sodium metabisulfite solution, both of which had been sparged with nitrogen separately, were added simultaneously into the reaction vessel with agitation. The reaction temperature rose rapidly to about 60° C. When the reaction temperature dropped down to about 52° C., the reactor was placed into a 63° C. water bath and the polymerization was continued at this temperature for about four hours. The product was a viscous solution with a bulk viscosity (Brookfield) viscosity of about 1,420 cps. The polymer had a number-average molecular weight of about 211,000 and a polydispersity of about 9.7 as determined by high pressure size exclusion chromatography (HPSEC) with an ultraviolet detector, calibrated with poly(acrylic) acid standards.

EXAMPLES 2 TO 6C

The following were added to a suitable reaction vessel equipped with stirring means, a thermocouple, and a nitrogen sparging system: About 60.52 grams of a 54% solution of acrylamide, about 94.84 grams of de-ionized water, about 15.06 grams of a 50% solution of sodium 2-acrylamido-2-methyl-1-propanesulfonate (AMPS), about 0.61 grams of 40% solution of diethylenetriaminepentaacetic acid, pentasodium salt (chelating agent), about 0.24 grams of 89% lactic acid, about 13.82 grams of Dispersant A, about 9.56 grams of 99% acrylic acid, and about 2.86 grams of 99% methacrylic acid (MM). After thorough mixing, the pH of the monomer solution was measured to be 4.03 at room temperature. The solution was stirred while adjusting its pH to 5.3 with 8.2 grams of a 30% ammonium hydroxide solution. The temperature was kept between 25° C. and 30° C. during the pH adjustment. After the pH adjustment, about 69.7 grams of ammonium sulfate was added and the solution was stirred to dissolve the salt The pH was re-measured after the salt had dissolved and readjusted to 5.3 with 0.15 grams of a 30% ammonium hydroxide. It was found that in most cases, e.g. in this example and the following examples, the pH did not change more than ±0.1 unit before and after the salt addition.

The reaction vessel was then sparged with nitrogen while stirring. After about 40 minutes, about 2.1 grams of a 2.5% solution of 2,2-azobis(2-amidinopropane)dihydrochloride (0.1% on monomer weight) was added and the reaction temperature was raised to about 400° C. After about an hour, about 22.5 grams of a 40% ammonium sulfate solution was added through a syringe pump at a rate of about 0.28 milliliters/minute (ml/min). The solution turned gradually into a white dispersion within two hours. Six hours later, the reaction temperature was raised to about 50° C. and was kept at 50° C. for a total polymerization time of about ten hours. After the polymerization, the aqueous dispersion product was discharged and its viscosity was measured with a Brookfield viscometer at 200° C. Examples 3 to 6C were prepared by a similar process except that the monomer compositions were varied as shown in Table 1 and the amounts of ammonium sulfate added were also varied slightly. Table 1 provides the bulk viscosities (BV, in units of centipoise (cps)) of the resulting dispersions, as measured with a Brookfield viscometer at 20° C. All the final ammonium sulfate concentrations were calculated after accounting for any water loss during the process. The pH values of the final aqueous dispersion products were measured and were generally found to be within ±0.1 unit before and after the polymerization. The results in Table 1 show the effect of varying salt level and polymer composition on the bulk viscosity of the resulting aqueous dispersion.

TABLE 1

| Example | AMD/AA/AMPS/MAA (% Mole Ratio) | $(NH_4)_2SO_4$, (%) | Dispersion BV (cps) |
|---|---|---|---|
| 2 | 70/20/5/5 | 27.8 | 3,400 |
| 3 | 70/20/4/6 | 26.8 | 1,600 |
| 4 | 70/20/3/7 | 27.0 | 780 |
| 5 | 70/20/2/8 | 27.6 | 2,600 |
| 6C | 70/20/1/9 | 26.0 | >100,000 |

AMD: acrylamide
AA: acrylic acid
AMPS: sodium 2-acrylamido-2-methyl-1-propanesulfonate
MAA: methacrylic acid

EXAMPLES 7 TO 9

The following were added to a suitable reaction vessel equipped with stirring means, a thermocouple, and a nitrogen sparging system: About 112.08 grams of a 50.4% solution of acrylamide, about 155.54 grams of de-ionized water, about 15.61 grams of a 50% solution of sodium 2-acrylamido-2-methyl-1-propanesulfonate, about 1.12 grams of a 40% solution of diethylenetriaminepentaacetic acid pentasodium salt (chelating agent), about 0.39 grams of 89% lactic acid, about 29.05 grams of Dispersant A, about 16.53 grams of 99% acrylic acid, and about 6.91 grams of 99% methacrylic acid. After thorough mixing, the pH of the resulting monomer solution was measured to be 4.17 at room temperature. The solution was stirred while adjusting its pH to 5.35 with about 16.61 grams of a 30% ammonium hydroxide solution. The temperature was kept between 25° C. and 30° C. during the pH adjustment. After the pH adjustment, about 131.31 grams of ammonium sulfate (~26% on total batch weight) was added and the solution was stirred to dissolve the salt. The pH was re-measured after the salt had dissolved and re-adjusted to 5.3 with about 0.1 grams of a 30% ammonium hydroxide.

The reaction vessel was then placed in a 35° C. water bath and sparged with nitrogen while about 29.1 grams of a dispersion (polymeric seed) prepared in the manner described in Example 4 was added with agitation. After about 50 minutes, about 3.2 grams of a 3% solution of ammonium persulfate and about 3.2 grams of a 3% sodium metabisulfite solution were added simultaneously via syringe pump into the reaction vessel at a rate of about 0.0125 mvmin. The solution turned gradually into a white dispersion within two to three hours, having dispersed polymer droplets of about 2 micrometers in size as observed under an optical microscope. Six hours later, the reaction temperature was raised to about 50° C. and was kept at about 50° C. for a total polymerization time of about ten hours. The aqueous dispersion product was then discharged and its bulk viscosity was measured with a Brookfield viscometer at 200° C. Examples 8 and 9 were prepared by a similar process except that the monomer compositions were varied and the total amount of ammonium sulfate added was also increased slightly as shown in Table 2. All of the final ammonium sulfate concentrations were calculated after accounting for any water loss during the process. The pH values of the final aqueous dispersion products were found to be within ±0.1 unit before and after polymerization. The results in Table 2 show the effect of varying salt level and polymer composition on the bulk viscosity of the resulting aqueous dispersion and also demonstrate the utilization of a polymer seed.

TABLE 2

| Example | AMD/AA/AMPS/MAA (% Mole Ratio) | $(NH_4)_2SO_4$, (%) | Dispersion BV (cps) |
|---|---|---|---|
| 7 | 70/20/3/7 | 26.31 | 1,030 |
| 8 | 70/18.5/2/9.5 | 26.81 | 546 |
| 9 | 70/17/1/12 | 27.8 | 326 |

AMD: acrylamide
AA: acrylic acid
AMPS: sodium 2-acrylamido-2-methyl-1-propanesulfonate
MAA: methacrylic acid

EXAMPLES 10 TO 14C

These examples were conducted in a manner similar to Example 7 except that sodium 2-acylamido-2-methyl-1-propanesulfonate was not included and an additional 7.5 grams of ammonium sulfate were added to the monomer solutions. An aqueous dispersion prepared in a manner similar to Example 7 was used as the seed. Table 3 lists the bulk viscosities of the resulting aqueous dispersions as a function of polymer composition and salt concentration.

TABLE 3

| Example | AMD/AA/MAA (% Mole Ratio) | $(NH_4)_2SO_4$, (%) | Dispersion BV (cps) |
|---|---|---|---|
| 10 | 70/15.5/14.5 | 28.4 | 254 |
| 11 | 70/17.5/12.5 | 28.3 | 1,020 |
| 12 | 70/20/10 | 28.4 | 1,680 |
| 13 | 70/22.5/7.5 | 28.6 | 3,680 |
| 14C | 70/25/5 | 28.7 | >100,000 |

AMD: acrylamide
AA: acrylic acid
MAA: methacrylic acid

EXAMPLES 15 TO 18

These examples were conducted in a manner similar to Example 2 except that methacrylic acid was not included and ammonium sulfate solution was not added during the polymerization. Also, the pH was adjusted to 5.5 (instead of 5.3 as in Example 2). The polymerization was continued at 40° C. for 16 hours and at 50° C. for four hours. Table 4 lists the bulk viscosities of the resulting aqueous dispersions as function of polymer composition and salt level.

TABLE 4

| Example | AMD/AA//AMPS (% Mole Ratio) | $(NH_4)_2SO_4$, (%) | Dispersion BV (cps) |
|---|---|---|---|
| 15 | 70/18/12 | 26.5 | 1,580 |
| 16 | 70/20/10 | 26.5 | 400 |
| 17 | 70/22/8 | 26.5 | 2,340 |
| 18 | 70/24/6 | 25.8 | 19,220 |

AMD: acrylamide
AA: acrylic acid
AMPS: sodium 2-acrylamido-2-methyl-1-propanesulfonate

EXAMPLES 19 TO 20

These examples were conducted in a manner similar to Example 10 except that the pH was raised to 5.6 and 5.9, and the salt concentrations were increased slighty. Table 5 lists the bulk viscosities of the resulting aqueous dispersions. These examples demonstrate that anionic aqueous dispersions having an anionic charge of greater than 16% and having advantageously low bulk viscosities may be prepared by the practice of the instant invention that remain in the form of aqueous dispersions even at pH 5.6 and 5.9.

TABLE 5

| Example | AMD/AA//MAA (% Mole Ratio) | $(NH_4)_2SO_4$, (%) | Dispersion pH | Dispersion BV (cps) |
|---|---|---|---|---|
| 19 | 70/15.5/14.5 | 29.0 | 5.6 | 2,180 |
| 20 | 70/15.5/14.5 | 29.3 | 5.9 | 30,100 |

AMD: acrylamide
AA: acrylic acid
MAA: methacrylic acid

EXAMPLES 21 TO 23

These examples were conducted in a manner similar to Example 2 except that sodium 2-acrylamido-2-methyl-1-propanesulfonate was replaced with sodium 4-styrenesulfonate (SSNa) and neither methacrylic acid nor lactic acid were added. Also, about 0.16 grams (3,050 ppm on total monomers) and 0.05 grams (740 ppm on total monomers) of glycidyl methacrylate (GMA) crosslinking agent was added to the monomer solutions in Example 22 and Example 23, respectively. In addition, the salt concentrations were increased slightly and 0.4% on monomer weight of 2,2-azobis(2-amidinopropane)dihydrochloride was added as the initiator. The polymerizations were conducted at about 55° C. for four hours and about 600° C. for an additional four hours. Table 6 lists the bulk viscosities of the resulting aqueous dispersions.

TABLE 6

| Example | AMD/AA/SSNa (% Mole Ratio) | $(NH_4)_2SO_4$, (%) | GMA (ppm) | Dispersion BV (cps) |
|---|---|---|---|---|
| 21 | 70/22.5/7.5 | 30.7 | 0 | 1,220 |
| 22 | 70/22.5/7.5 | 28.5 | 3,050 | 2,040 |
| 23 | 70/22.5/7.5 | 30.9 | 740 | 1,260 |

AMD: acrylamide
AA: acrylic acid
SSNa: Sodium 4-styrene sulfonate

EXAMPLES 24 TO 25

These examples were conducted in a manner similar to Example 7 except that the total anionic of the polymers was 40% in Example 24 and 50% in Example 25. The initial ammonium sulfate concentration was 21.5%. An additional 29.8 grams of 42% ammonium sulfate solution (2.5% on the total batch weight) was added at a rate of 0.3 ml min during the polymerization. After the polymerization, about 15 grams (Example 24) or 20 grams (Example 25) of ammonium sulfate was added. Table 7 provides the bulk viscosities of the resulting anionic aqueous dispersions.

TABLE 7

| Example | AMD/AA/AMPS/MAA (% Mole Ratio) | Anionicity, (%) | $(NH_4)_2SO_4$, (%) | Dispersion BV (cps) |
|---|---|---|---|---|
| 24 | 60/26.7/6.7/6.6 | 40 | 27.0 | 2,700 |
| 25 | 50/33.3/8.3/8.4 | 50 | 28.1 | 13,200 |

AMD: acrylamide
AA: acrylic acid
AMPS: sodium 2-acrylamido-2-methyl-1-propanesulfonate
MM: methacrylic acid

EXAMPLE 26

These examples were conducted in a manner similar to Example 7 except that the total anionicity of the polymer was increased to 80%, the total monomer concentration was lowered from 17.5% to 15% and the total batch weight was lowered from 500 grams to 400 grams. The dispersion pH was 5.3. The polymer composition was, on a percent mole basis, AMD/AA/AMPS=20/40/40. No seed was added and a lower initial ammonium sulfate concentration (23% on the total batch weight) was used. Additional ammonium sulfate was added during the polymerization to lower the viscosity while increasing the salt concentration to the appropriate level. The final ammonium sulfate concentration was 29.3% and the bulk viscosity of this anionic aqueous dispersion was 2,060 cps. This example demonstrates that an anionic aqueous dispersion containing a polymer with an anionic charge of 80% can be prepared at pH 5.3.

EXAMPLE 27

This example illustrates the preparation of an anionic aqueous dispersion at pH 6.3 at a 1.8 kilogram batch scale. The polymer composition was, on a percent mole basis, AMD/AA/AMPS=35/5/60. The example was conducted in a manner similar to Example 26 except that the total monomer concentration was 17.5% and the initial ammonium sulfate concentration was 10% on the total batch weight. Additional ammonium sulfate was added during the polymerization to lower the viscosity while increasing the salt concentration to the appropriate level. The final ammonium sulfate concentration was 19.3% and the bulk viscosity of the resulting anionic aqueous dispersion was about 2,125 cps.

EXAMPLE 28

This example illustrates the incorporation of a hydrophobic monomer into an anionic aqueous dispersion at pH 5.3 for a 400 grams batch scale. The hydrophobic monomer used was acrylonitrile (AN). The polymer composition was, on a percent mole basis, AMD/AA/AMPS/AN=65/15/15/5. The example was conducted in a manner similar to Example 26 except that the initial ammonium sulfate concentration was 21.5% on the total batch weight. Additional ammonium sulfate was added during the polymerization to lower the bulk viscosity while increasing the salt concentration to the appropriate level. The final ammonium sulfate concentration was 26.2% and the bulk viscosity of the resulting anionic aqueous dispersion was about 4,000 cps.

EXAMPLE 29

In this example, an anionic aqueous dispersion was prepared at pH 6.5 having an anionic polymer composition of AMD/AA/AMPS=70/20/10. The monomer concentration was 10% and the ammonium sulfate concentration was 27.5% based on a total batch weight of 300 grams. The dispersant was a copolymer of 50 mole % acrylamide and 50 mole % acrylic acid and was prepared by a process similar to Example 1, except that the wt. % polymer was 15%. The polymerization was conducted in a manner similar to Example 26, using a monomer to dispersant ratio (M/D) of 12:1 (based on real polymer), except that about 12 grams of a 2.5% ammonium persulfate solution was added initially to the monomer solution, followed by the addition of about 4.5 grams of a 0.75% sodium metabisulfite solution at a rate of about 0.02 mv min to initiate the polymerization, and no lactic acid was added. The polymerization was carried out at about 35° C. for about 16 hours, then at about 45° C. for about four hours. The bulk viscosity of the resulting aqueous dispersion was about 3,660 cps.

EXAMPLE 30

In this example, an anionic aqueous dispersion was prepared having an anionic polymer with a composition of AMD/AA/AMPS=73.95/14.55/11.5 and also containing an additional 15 ppm (based on the total monomer weight) of N, N'-methylenebisacrylamide (MBA). The monomer concentration was about 15% and the ammonium sulfate concentration was about 22% based on a total batch weight of 300 grams. The dispersant was a copolymer of 20 mole % acrylamide and 80 mole % acrylic acid, was prepared by a process similar to Example 1 (except that the wt. % polymer was 15%), and had a weight-average molecular weight of about 442,000 and a polydispersity of about 11.3. The preparation of the dispersion was similar to Example 26 at a pH of 5.3, using a monomer to dispersant ratio (M/D) of 15:1 (based on real polymer), except that about 1.87 grams of a 2.5% ammonium persulfate was added initially to the monomer solution, followed by the addition of about 7.0 grams of a 0.75% sodium metabisulfite solution at a rate of about 0.02 ml/min to initiate the polymerization. The polymerization was carried out at about 40° C. for about 16 hours, then at about 50° C. for about four hours. The resulting anionic aqueous dispersion had a bulk viscosity of about 65,000 cps.

EXAMPLES 31–35

These examples illustrate the effect of salt concentration on the bulk viscosity of anionic aqueous dispersions. The dispersion was prepared at pH 5.3 on a 1.5 kilograms batch scale. The polymer composition was, on a percent mole basis, AMD/AA/AMPS/MAA=70/20/5/5. The polymerization process was similar to Example 7 except that the initial ammonium sulfate concentration was about 21.5% on the total batch weight and about 107.14 grams of a 42% ammonium sulfate solution was added at a rate of about 0.3 ml/min during the polymerization to lower the viscosity while raising the salt concentration to the appropriate level. The final ammonium sulfate concentration was 24.9% and the resulting aqueous dispersion bulk viscosity was about 7,700 cps. Additional ammonium sulfate was added progressively to lower the bulk viscosity. Table 8 provides the total ammonium sulfate concentrations after each salt addition and the corresponding bulk viscosities.

TABLE 8

| Example | AMD/AA/AMPS/MAA (% Mole Ratio) | $(NH_4)_2SO_4$, (%) | Dispersion BV (cps) |
|---|---|---|---|
| 31 | 70/20/5/5 | 24.9 | 7,700 |
| 32 | 70/20/5/5 | 25.7 | 3,360 |

TABLE 8-continued

| Example | AMD/AA/AMPS/MAA (% Mole Ratio) | (NH$_4$)$_2$SO$_4$, (%) | Dispersion BV (cps) |
|---------|-------------------------------|------------------------|---------------------|
| 33 | 70/20/5/5 | 26.2 | 1,620 |
| 34 | 70/20/5/5 | 26.6 | 820 |
| 35 | 70/20/5/5 | 27.3 | 460 |

AMD: acrylamide
AA: acrylic acid
AMPS: sodium 2-acrylamido-2-methyl-1-propanesulfonate
MAA: methacrylic acid

EXAMPLES 36–40

These examples illustrate the effect of the dispersant level on the bulk viscosity of the anionic aqueous dispersion. The polymerization process was conducted in a manner similar to Example 24 except that the composition of the polymer was AMD/AA/AMPS/MM=70/20/3/7 and the batch weight was about 400 grams. The amount of dispersant is shown in Table 9 as a function of the weight ratio of monomer to dispersant (M/D). Table 9 lists the M/D ratio and the final salt concentrations of these anionic aqueous dispersions and their corresponding bulk viscosities.

TABLE 9

| Example | AMD/AA/AMPS/MAA (% Mole Ratio) | M/D Ratio | (NH$_4$)$_2$SO$_4$, (%) | Dispersion BV (cps) |
|---------|-------------------------------|-----------|------------------------|---------------------|
| 36 | 70/20/3/7 | 6 | 25.6 | 10,000 |
| 37 | 70/20/3/7 | 8 | 26.4 | 11,200 |
| 38 | 70/20/3/7 | 10 | 25.9 | 4,400 |
| 39 | 70/20/3/7 | 12 | 25.6 | 1,540 |
| 40 | 70/20/3/7 | 13.5 | 25.9 | 3,780 |

EXAMPLE 41

This example illustrates the preparation of a post-reacted anionic aqueous dispersion. A dispersion containing an anionic polymer having a composition of AMD/AA/AMPS=74/14.5/11.5 was prepared at pH 5.3 in a manner similar to that described in Example 30, except that MBA was not added and a M/D of 15:1 was used. The monomer concentration was about 17.5% and the ammonium sulfate concentration was about 22% based on a total batch weight of 300 grams. The dispersant was a copolymer of 5 mole % acrylamide and 95 mole % acrylic acid prepared as in Example 1C, having a weight-average molecular weight of 163,000 and a polydispersity of 9.3. The aqueous dispersion had a bulk viscosity of 5,280 cps which decreased to 544 cps after adding ammonium sulfate to increase the salt concentration from 22% to 23.1%. The hydroxamation post-reaction was conducted on a 50 gram sample of the dispersion sample in which the pH was adjusted to 6.0 with sodium hydroxide solution. About 0.68 grams of hydroxylamine-sulfuric acid salt was added to this sample, the sample was thoroughly mixed, and the resulting admixture was placed in an oven at 50° C. overnight. The resulting hydroxamated anionic aqueous dispersion did not show any significant change in dispersion characteristics. A ferric ion test on the anionic polymer showed the existence of hydroxamic acid salt groups.

EXAMPLE 42

This example illustrates a method of using an anionic aqueous dispersion to dewater a suspension of dispersed mineral solids. An anionic aqueous dispersion with an anionic polymer composition of AMD/AA/AMPS=74/14.5/11.5 was prepared at pH 5.3 by a process similar to that described in Example 30, except that MBA was not added, the monomer concentration was 17.5%, the dispersant was a copolymer containing 95% acrylic acid and 5% acrylamide, and the polymerization was conducted at 35° C. for 16 hours and 45° C. for an additional 4 hours. The resulting aqueous dispersion had a bulk viscosity of about 403 cps. A coal slurry was obtained having a solids level of about 5%. The aqueous dispersion was diluted with water to make three dosing solutions. Each of the dosing solutions was then intermixed vigorously with respective samples of the coal slurry at a dose of about 1.5 parts of polymer by weight per million parts by volume of coal slurry (ppm), 2.0 ppm and 2.5 ppm, respectively. The flocculated coal solids were allowed to settle and the rate of settling and the supernatant clarity were measured. These settling rates and clarities were comparable to those achieved with commercial anionic mineral dewatering products.

EXAMPLE 43

This example demonstrates a method of using an anionic aqueous dispersion to dewater a suspension of dispersed paper solids. An aqueous dispersion containing an anionic polymer with a composition of AMD/AA/MM=70/20/10 was prepared at pH 5.3 by a process similar to that described in Example 10 except that about 12626 grams of ammonium sulfate (25% on total batch weight) was added and a redox initiator (3% sodium bromate/0.4% SO$_2$) was used. The resulting aqueous dispersion had a bulk viscosity of about 3,940 cps. A paper retention test was conducted on an alkaline paper furnish having a concentration of 3.52 grams per liter. The furnish was first treated with an alum solution (5 ppm, based on paper solids) and a cationic starch solution (10 ppm, based on paper) to form a pretreated suspension of paper solids. Three polymer dosing solutions were prepared by diluting the aqueous dispersion so that the polymer dosage was 2 ppm, 4 ppm and 6 ppm (based on paper solids) for the three dosing solutions, respectively. Each dosing solution was then vigorously intermixed with a respective sample of the pretreated suspension of paper solids to produce flocculated paper solids, then the drainage rates were determined by recording the time for a measured volume of aqueous liquid to drain through the flocculated paper solids. The drainage times were 51, 59 and 67 seconds for the 2 ppm, 4 ppm and 6 ppm dosing solutions, respectively. These drainage rates are comparable to those achieved with commercial anionic retention aid products.

EXAMPLE 44

This example demonstrates a method for using an anionic aqueous dispersion to dewater a suspension of dispersed solids in a paper deinking process. An anionic aqueous dispersion containing an anionic polymer with a composition of AMD/AA/MAA=70/20/10 was prepared at pH 5.1 by a process similar to that described in Example 10 except that the total batch weight was 2.18 kilograms, the ammonium sulfate level was 28% by weight, the dispersant was a commercial AMD/AA copolymer containing 70% acrylic acid and 30% acrylamide (made by hydrolysis of polyacrylonitrile), an aqueous dispersion prepared in a manner similar to Example 12 was used as the seed, and a redox initiator (3% sodium bromate/0.4% sulfur dioxide) was used to initiate polymerization. The resulting anionic aqueous dispersion had a bulk viscosity of about 1,440 cps.

A paper slurry containing about 0.25% recycled magazine and newsprint was obtained. Three polymer dosing solutions were prepared by diluting the aqueous dispersion so that the polymer dosage was 1 ppm, 1.5 ppm and 2 ppm (based on paper solids) for the three dosing solutions, respectively. The test was conducted on three paper slurry samples by adding 8 ppm (based on paper solids) of a low molecular weight cationic polymer to each slurry, followed by the three dosing solutions, respectively. The resulting admixtures were stirred, the solids were allowed to settle for 30 seconds, and the clarity of the supernatant was measured. In a control sample without anionic polymer, the supernatant turbidity was about 1,970 NTU. For each of the dosing solutions containing anionic polymer, improved clarity was obtained as evidenced by turbidity values which were below about 500 NTU. At the 1.5 ppm and 2.0 ppm doses, the turbidity values were below 300 ppm. These clarity results are comparable to those achieved with commercial anionic deinking products.

EXAMPLE 45

This example demonstrates the preparation of an anionic aqueous dispersion which contains a water-swellable polymer with composition AMD/AA/SSNa=77.5/15/7.5. In addition to the three monomers, 500 ppm (based on total monomer weight) of N,N'-methylenebisacrylamide (MBA) was also added. The monomer concentration was about 10% and the ammonium sulfate concentration was about 27.5% based on a total batch weight of 300 grams. The dispersant was a copolymer of 50 mole % acrylamide and 50 mole % acrylic acid prepared by a process similar to that described in Example 1. The aqueous dispersion was prepared in a manner similar to Example 26 except that the dispersion pH was 6.6, and 1.2 grams of 2.5% ammonium persulfate solution was added initially to the monomer solution, followed by the addition of 4.5 grams of 0.75% sodium metabisulfite solution at a rate of 0.02 ml/min to initiate the polymerization. The polymerization was carried out at about 35° C. for about 16 hours, then at about 50° C. for about four hours. The bulk viscosity of the resulting anionic aqueous dispersion at pH 6.6 was 40,500 cps. The dispersion was diluted with water to form an admixture with a polymer concentration of about 0.2%. This admixture had a hazy appearance, indicating the presence of water-swellable polymer.

EXAMPLE 46

This example demonstrates the preparation of an anionic aqueous dispersion which contains a water-soluble polymer with composition AMD/AA/MAA=67.5/20/12.5 at pH 5.2. The process was conducted in a manner similar to Example 44, except that the sodium bromate was added to the monomer solution instead of being added during the polymerization. The resulting anionic aqueous dispersion contained 28.4% ammonium sulfate and had a bulk viscosity of 3,560 cps.

EXAMPLE 47

This example was conducted in the same manner as Example 46, except that only 40% of the total methacrylic acid charge was present when polymerization was initiated and the total polymerization time was 6 hours. A 20% methacrylic acid solution in 10% ammonium sulfate with pH adjusted to 5.2 was prepared using the remaining 60% of the methacrylic acid. Thirty minutes after the polymerization was initiated, this methacrylic acid solution was added continuously to the reaction vessel via syringe pump over the course of about six hours. The resulting anionic aqueous dispersion prepared by this monomer feeding process had a bulk viscosity of 810 cps, as compared to the bulk viscosity of 3,560 cps achieved in Example 46. This example demonstrates that a monomer feeding process may be used to significantly lower the bulk viscosity of an anionic aqueous dispersion.

EXAMPLE 48

The aqueous dispersion of Example 27 was spray-dried on a commercially available laboratory spray dryer. The chamber of the laboratory spray dryer was 760 millimeters (mm) in diameter with a 860 mm vertical side and a 65 degree conical bottom. Nominal gas flow through the dryer was about 180 cubic meters per hour. The aqueous dispersion feed was fed at the center of the top of the chamber using a variable speed pump, through a two-fluid nozzle using air for atomization. The outlet gas temperature was 86° C. and controlled by varying the inlet gas temperature (165° C.) and the feed rate (60 milliliters/minute). To provide an inert atmosphere, the spray-dryer was supplied with nitrogen gas from a cryogenic storage tank The dried polymer product was discharged through the bottom of the dryer cone to a cyclone where the dry product was removed and collected. Residence time in the dryer was approximately 15 seconds. The resultant spray-dried polymer particles were agglomerated to provide anionic polymer agglomerates, readily soluble in water, having a volatiles content of 3.2% and a bulk density of about 0.40 grams per cubic centimeter (g/cc).

EXAMPLES 49 to 50

An aqueous dispersion having a bulk viscosity of about 2920 cps was prepared in the same manner as Example 42, except that the dispersant was a 15% solution of a poly (acrylic acid) having a molecular weight of about 124,000. The monomer to dispersant ratio (M/D, based on real polymer) was 15. This aqueous dispersion was concentrated by placing about 114 grams into a suitable vessel and heating to 45° C. under flowing nitrogen. A total of 23.2 grams of water was removed by this dehydration process. The aqueous dispersion remained stable demonstrating that dehydration is effective for achieving high solids, low bulk viscosity aqueous dispersions as shown in Table 10.

TABLE 10

| Example No. | Polymer Solids (%) | Bulk Viscosity (cps) |
| --- | --- | --- |
| 49 (as polymerized) | 18.6 | 2920 |
| 50 | 23.4 | 880 |

What is claimed is:

1. An aqueous dispersion comprised of (a) salt solution comprised of from about 5% to about 35% inorganic salt, by weight based on said aqueous dispersion; (b) an anionic water-soluble or water-swellable vinyl-addition polymer that is comprised of from about 1 mole % to about 100 mole % of anionic recurring units, based on total moles of recurring units in said polymer, and that is insoluble in said salt solution; and (c) a dispersant polymer which is a vinyl-addition polymer that is different from said anionic polymer; wherein said anionic polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous dispersion is substantially free of an amount of cationic organic salt that is effective to precipitate said anionic polymer.

2. An aqueous dispersion as claimed in claim 1, wherein said anionic polymer is further comprised of (alk)acrylamide recurring units.

3. An aqueous dispersion as claimed in claim 1, wherein at least about 20% of said anionic recurring units are methacrylic acid or an ammonium or alkali metal salt thereof.

4. An aqueous dispersion as claimed in claim 1, wherein at least about 20% of said anionic recurring units are 2-acrylamido-2-methylpropanesulfonic acid or an ammonium or alkali metal salt thereof.

5. An aqueous dispersion as claimed in claim 1, wherein at least about 20% of said anionic recurring units are styrenesulfonic acid or an ammonium or alkali metal salt thereof.

6. An aqueous dispersion as claimed in claim 1, wherein said anionic polymer is water-soluble.

7. An aqueous dispersion as claimed in claim 1, wherein said salt solution comprises a sulfate, hydrogenphosphate or chloride salt.

8. An aqueous dispersion as claimed in claim 1 wherein said anionic polymer is comprised of greater than 18 mole % of said anionic recurring units.

9. An aqueous dispersion as claimed in claim 1, wherein said anionic polymer is further comprised of hydrophobic recurring units.

10. An aqueous dispersion as claimed in claim 1, wherein said anionic polymer is substantially free of benzyl group-containing cationic recurring units.

11. An aqueous dispersion as claimed in claim 1, wherein said anionic polymer contains hydroxamic acid or hydroxamic acid salt groups.

12. An aqueous dispersion as claimed in claim 1, wherein said dispersant polymer is more soluble in the aqueous salt solution than said anionic polymer.

13. An aqueous dispersion as claimed in claim 1, wherein said dispersant polymer is an anionic polymer or copolymer.

14. An aqueous dispersion as claimed in claim 13, wherein said dispersant polymer or copolymer comprises at least about 20% of 2-acrylamido-2-methylpropanesulfonic acid anionic recurring units or an ammonium or alkali metal salt thereof.

15. An aqueous dispersion as claimed in claim 1, wherein said dispersant polymer is a homopolymer of acrylic acid or a copolymer of acrylamide and acrylic acid.

16. A process for making an aqueous dispersion which comprises polymerizing anionic vinyl-addition monomers to form an anionic water-soluble or water-swellable polymer having from about 1 mole % to about 100 mole % of anionic recurring units, based on total moles of recurring units in said polymer; wherein said polymerizing is conducted in an aqueous solution comprised of from about 5% to about 35% inorganic salt, by weight based on said aqueous dispersion, and a dispersant polymer which is a vinyl-addition polymer that is different from said anionic polymer; wherein said anionic vinyl-addition monomers are comprised of an amount of anionic monomers, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulfuric acid, ammonium and alkali metal salts thereof, and mixtures thereof, that is effective to render said polymer insoluble in said salt solution at a pH of 5.1; and wherein said aqueous solution is substantially free of an amount of cationic organic salt that is effective to precipitate said anionic polymer.

17. A process as claimed in claim 16, wherein said anionic polymer is further comprised of (alk)acrylamide recurring units.

18. A process as claimed in claim 16, wherein said anionic recurring units are comprised of 20 mole % or more of recurring units selected from the group consisting of methacrylic acid, 2-acrylamido-2-methylpropanesulfonic acid, styrenesulfonic acid, and ammonium and alkali metal salts thereof.

19. A process as claimed in claim 16, which comprises polymerizing anionic vinyl-addition monomers to form an anionic water-soluble polymer.

20. A process as claimed in claim 16, wherein said inorganic salt is a sulfate, hydrogenphosphate or chloride salt.

21. A process as claimed in claim 16, wherein said anionic polymer is comprised of about 18 mole % or more of said anionic recurring units.

22. A process as claimed in claim 16, wherein said anionic polymer is substantially free of benzyl group containing cationic recurring units.

23. A process as claimed in claim 16, wherein a portion of said inorganic salt is added to said aqueous solution during the course of said polymerizing.

24. A process as claimed in claim 16, wherein a portion of said anionic vinyl-addition monomers is added to said aqueous solution during the course of said polymerizing.

25. A process as claimed in claim 16, wherein said aqueous solution comprises a seed polymer.

26. A process as claimed in claim 25, wherein said seed polymer is comprised of the residue of a prior polymerization batch.

27. A process as claimed in claim 16, which further comprises post-reacting said anionic polymer.

28. A process as claimed in claim 16, which further comprises dehydrating said aqueous dispersion to form a concentrated aqueous dispersion.

29. A process as claimed in claim 28, wherein said concentrated aqueous dispersion has a bulk viscosity that is lower than the bulk viscosity of said aqueous dispersion.

30. A process as claimed in claim 16, wherein said dispersant polymer is more soluble in the aqueous salt solution than said anionic polymer.

31. A process as claimed in claim 16, wherein said dispersant polymer is an anionic polymer or copolymer.

32. A process as claimed in claim 31, wherein said dispersant polymer or copolymer comprises at least about 20% of 2-acrylamido-2-methylpropanesulfonic acid anionic recurring units or an ammonium or alkali metal salt thereof.

33. A process as claimed in claim 16, wherein said dispersant polymer is a homopolymer of acrylic acid or a copolymer of acrylamide and acrylic acid.

34. A process as claimed in claim 16, wherein the process is conducted at between pH 1 and pH 7.

35. A method for dewatering a suspension of dispersed solids, comprising intermixing an aqueous dispersion of polymers, or aqueous admixture thereof, in an amount effective for flocculation, with a suspension of dispersed solids, and dewatering said suspension of dispersed solids, wherein said aqueous dispersion is comprised of (a) salt solution comprised of from about 5% to about 35% inorganic salt, by weight based on said aqueous dispersion; (b) an anionic water-soluble or water-swellable vinyl-addition polymer that is comprised of from about 1 mole % to about 100 mole % of anionic recurring units, based on total moles of recurring units in said polymer, and that is insoluble in said salt solution; and (c) a dispersant polymer which is a vinyl-addition polymer that is different from said anionic polymer; wherein said anionic polymer is comprised of an amount of anionic recurring units, selected from the group consisting of methacrylic acid, ethacrylic acid, maleic acid, itaconic acid, 2-acrylamido-2-methylpropanesulfonic acid, vinylsulfonic acid, vinylsulfuric acid, vinylphosphonic acid, styrenesulfonic acid, styrenesulforic acid, ammonium and alkali metal salts thereof, and mixtures thereof, that is effective to render said polymer insoluble in said salt solution at a pH of 5.1; and wherein said aqueous dispersion is substantially free of an amount of cationic organic salt that is effective to precipitate said anionic polymer.

36. A method as claimed in claim 35, wherein said anionic polymer is further comprised of (alk)acrylamide recurring units.

37. A method as claimed in claim 35, wherein at least about 20% of said anionic recurring units are selected from the group consisting of methacrylic acid, 2-acrylamido-2-methylpropanesulfonic acid, styrenesulfonic acid, hydroxamic acid, or an ammonium or alkali metal salt thereof.

38. A method as claimed in claim 35, wherein said suspension of dispersed solids is comprised of paper solids.

39. A method as claimed in claim 35, wherein said suspension of dispersed solids is comprised of mineral solids.

40. A method as claimed in claim 39, wherein said anionic polymer contains hydroxamic acid or hydroxamic acid salt groups and wherein said dispersed solids are comprised of red mud.

41. A method as claimed in claim 35, wherein said suspension of dispersed solids is comprised of biological solids.

42. A method as claimed in claim 35, wherein said anionic polymer is water-soluble.

43. A method as claimed in claim 35, wherein said anionic polymer is substantially free of benzyl group-containing cationic recurring units.

* * * * *